(12) United States Patent
Wawerski

(10) Patent No.: US 7,293,680 B1
(45) Date of Patent: Nov. 13, 2007

(54) LIFTING DEVICE

(76) Inventor: George L. Wawerski, 1804 N. 2753rd Rd., Ottawa, IL (US) 61350

( * ) Notice: Subject to any disclaimer, the term of this patent is extended or adjusted under 35 U.S.C. 154(b) by 287 days.

(21) Appl. No.: 11/081,313

(22) Filed: Mar. 16, 2005

(51) Int. Cl.
*B60R 9/00* (2006.01)

(52) U.S. Cl. ...................... 224/401; 414/462

(58) Field of Classification Search ............. 224/401, 224/402, 403, 408, 279, 495, 498, 499, 504, 224/522
See application file for complete search history.

(56) References Cited

U.S. PATENT DOCUMENTS

| | | | | |
|---|---|---|---|---|
| 1,256,861 | A * | 2/1918 | Adams | 224/487 |
| 1,300,826 | A * | 4/1919 | Donnell | 224/499 |
| 1,467,504 | A | 9/1923 | Sabarros | |
| 1,792,586 | A * | 2/1931 | Higgins | 224/401 |
| 1,817,056 | A * | 8/1931 | Belgard | 224/498 |
| 3,822,801 | A | 7/1974 | Morgan, Jr. | |
| 5,224,636 | A * | 7/1993 | Bounds | 224/510 |
| 5,645,292 | A | 7/1997 | McWilliams et al. | |
| 5,662,451 | A | 9/1997 | Muzzi et al. | |
| 5,911,556 | A * | 6/1999 | Caldwell | 414/462 |
| 5,964,565 | A * | 10/1999 | Skotzky | 414/462 |
| 5,971,241 | A * | 10/1999 | Allen et al. | 224/497 |
| D417,172 | S * | 11/1999 | Smith et al. | D12/101 |
| 6,286,854 | B1 * | 9/2001 | Cross | 280/504 |
| 6,461,095 | B1 | 10/2002 | Puska | |
| 6,589,004 | B2 | 7/2003 | Reed | |
| 6,638,001 | B1 * | 10/2003 | McKinley | 224/401 |
| 6,769,858 | B1 * | 8/2004 | Butler et al. | 414/462 |
| 6,869,265 | B2 * | 3/2005 | Smith et al. | 414/462 |
| 6,948,732 | B2 * | 9/2005 | Amacker | 280/415.1 |
| 2002/0168257 | A1 * | 11/2002 | Smith et al. | 414/462 |

FOREIGN PATENT DOCUMENTS

WO   WO2006/041315 A1 * 4/2006

* cited by examiner

*Primary Examiner*—Nathan J. Newhouse
*Assistant Examiner*—Margaret Olson
(74) *Attorney, Agent, or Firm*—Mathew R. P. Perrone, Jr.

(57) ABSTRACT

A lifting device has a base rack section, a middle section and a vehicle mounting section, each of three sections having hand grips and being movably secured together in order to promote the lifting or moving of a heavy item from one section to another. As that heavy item reaches the first section, the item may be transferred section to section sequentially, and finally to a desired location in or on a vehicle.

13 Claims, 5 Drawing Sheets

LIFTING DEVICE

This invention relates to a lifting device, and more particularly, to a lifting device, which assists with the lifting of heavy items to a desired position for transport.

BACKGROUND OF THE INVENTION

Transportation of heavy items is always a problem. Firstly, a heavy item must be lifted. Then that item must be placed in a desired position. After that desired position is reached, that heavy item may be transported.

Hunting is a popular pastime. It provides an opportunity to obtain food, and have a sporting activity. When hunting results in game, it is desirable to achieve the recovery of the game in an efficient manner. With smaller game, recovery is relatively simple, because it is easy to lift, transport and store such game. With larger game, lifting becomes a problem.

Whatever type of heavy item is desired to be lifted, it is many times desirable to have a device to assist in such lifting. That device is especially useful if it may be transferred to a variety of desired positions for use. To that end, the device must be strong, yet lightweight. Such a strong device supports the heavy item. The lightweight aspects promote ease of movement of the device from one desired location or position to another. Balancing strength and lightweight qualities offer great advantages.

SUMMARY OF THE INVENTION

Among the many objectives of this invention is the provision of a strong, lightweight, lifting device.

A further objective of this invention is the provision of a lifting device, which is easily installed.

Yet a further objective of this invention is the provision of a lifting device, which is strong.

A still further objective of this invention is the provision of a lifting device, which is easily moved from one location to another.

Another objective of this invention is the provision of a lifting device, which is easily transported.

Yet another objective of this invention is the provision of a lifting device, which is easily switched from one vehicle to another.

These and other objectives of the invention (which other objectives become clear by consideration of the specification, claims and drawings as a whole) are met by providing a lifting device having a base rack section, a middle section and a vehicle mounting section, each of three sections having hand grips and being movably secured together in order to promote the lifting or moving of a heavy item from one section to another. As that heavy item reaches the first section, the item may be transferred section to section sequentially, and finally to a desired location in or on a vehicle.

BRIEF DESCRIPTION OF THE DRAWINGS

Throughout the figures of the drawings, where the same part appears in more than one figure of the drawings, the same number is applied thereto.

DESCRIPTION OF THE PREFERRED EMBODIMENTS

For the lifting device, there are three sections connected by hinges. Typically, each section resembles the other sections. Two, four and larger numbers of sections are operable, but three sections are preferred. The sections are connected, but may move relative to each other.

A base rack section generally contacts the ground. The middle section is connected on one side to the base rack section by a pair of hinges or other connecting devices. The middle section is also connected on an opposing side to a vehicle mounting section.

Each of the sections has a base frame. Preferably, the base frame is substantially rectangular. To the base frame are attached a pair of raised parallel cross members. By raised is member extending above the plane of the frame. To each pair of parallel cross members are secured a pair of parallel gripping members, except for the vehicle mounting section, which requires only one gripping member. The gripping members are spaced sufficiently well for a person using the lifting device to move an object from the base rack section to the middle section, and then to the vehicle mounting section. A handgrip on the vehicle mounting section permits the object to be moved to the vehicle.

The frame for the base rack section has a slightly larger perimeter than the perimeter for the middle section and the vehicle mounting section. This variation facilitates the first positioning and ultimate lifting of the heavy item.

The parallel cross members are raised from the frame in any suitable fashion. They may be arcuate, trapezoidal or any other desired raised shape.

Preferably, the lifting device is made of weldable, tubular metal, having sufficient strength to stand the weight of the object being lifted, yet light enough to be easily transported. While solid rods are operable, the tubular structure is felt to strong yet lightweight. Other tubular material, such as plastic or fiberglass, having the desired strength is also operable.

Typically, the object being lifted is too heavy for a single person to lift high enough to reach the vehicle. That object, however, can be placed on the base rack section. Then the handgrips permit the moving of the object from the base rack section sequentially to the middle section and the vehicle mounting section. The mechanical advantage provided by lifting device of this invention permits that object to be placed at a desired point on the vehicle. Lifting device is then used to secure that object in position on the vehicle.

This lifting device may be attached to any vehicle having a bed or support for carrying heavy objects. Typical of those vehicles are all-terrain vehicles and pickup trucks. Such vehicles are especially useful in hunting larger game. That vehicle may go to the site of the downed game, with the lifting device in place and be used to carry the downed game to a desired location. Other uses than hunting are also possible. Any heavy object to be transported can be lifted to a vehicle by using the lifting device and only one person. Then that heavy object can be transported as desired.

Figure 1:
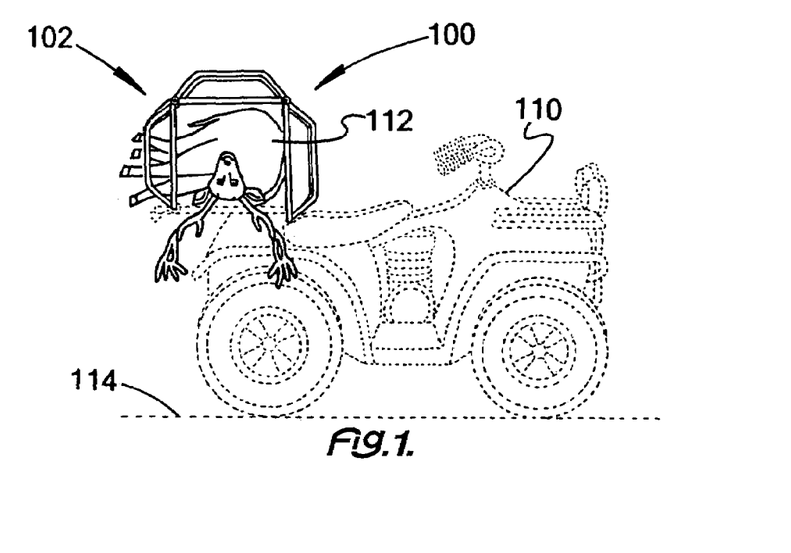
FIG. 1 depicts a perspective view of a lifting device 100 of this invention in a mounted completely folded position 102 mounted on an all-terrain vehicle 110, while encompassing or securing a deer 112 thereon.
Figure 2:
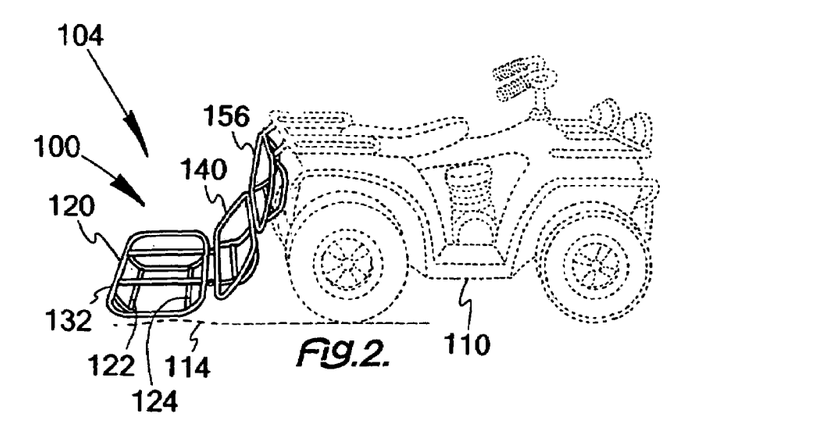
FIG. 2 depicts a perspective view of a lifting device 100 of this invention in a completely open position 104 removably mounted on an all-terrain vehicle 110.

Referring now to FIG. 1 and FIG. 2, lifting device 100 of this invention is removably mounted on an all-terrain vehicle 110. By moving the deer 112 onto the base rack section 120 while the base rack section 120 is on the ground 114, one of parallel long sides 132 is used to lift base rack section 120. Then first base gripping member 122 is gripped to move deer 112 onto the middle section 140. Sequentially, deer 112 moves from middle section 140 to vehicle mounting section 156 and onto all-terrain vehicle 110 for transportation.

Figure 3:
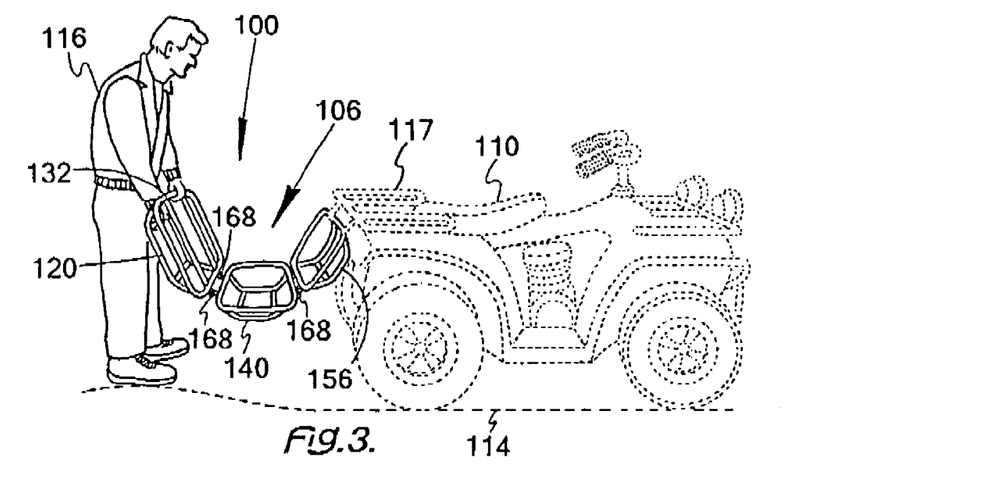
FIG. 3 depicts a perspective view of a lifting device 100 of this invention in a partially lifted position 106 mounted on an all-terrain vehicle 110.
Figure 4:
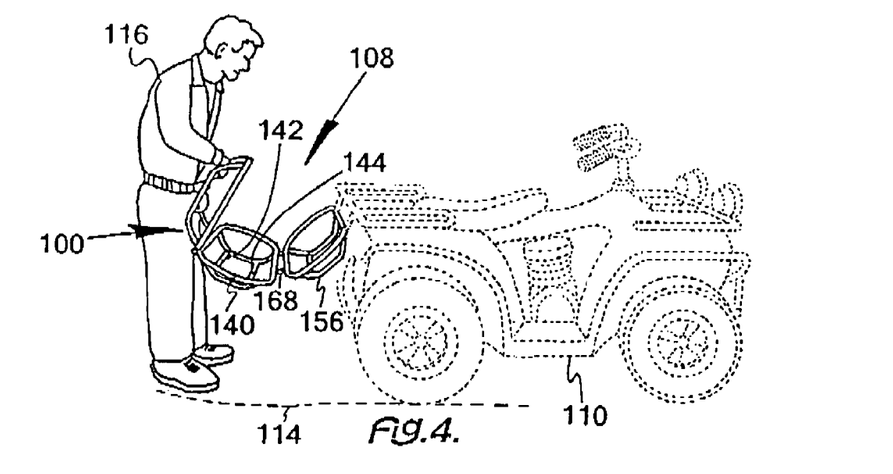
FIG. 4 depicts perspective view of a lifting device 100 of this invention in a second lifted position 108 mounted on an all-terrain vehicle 110.
Figure 5:
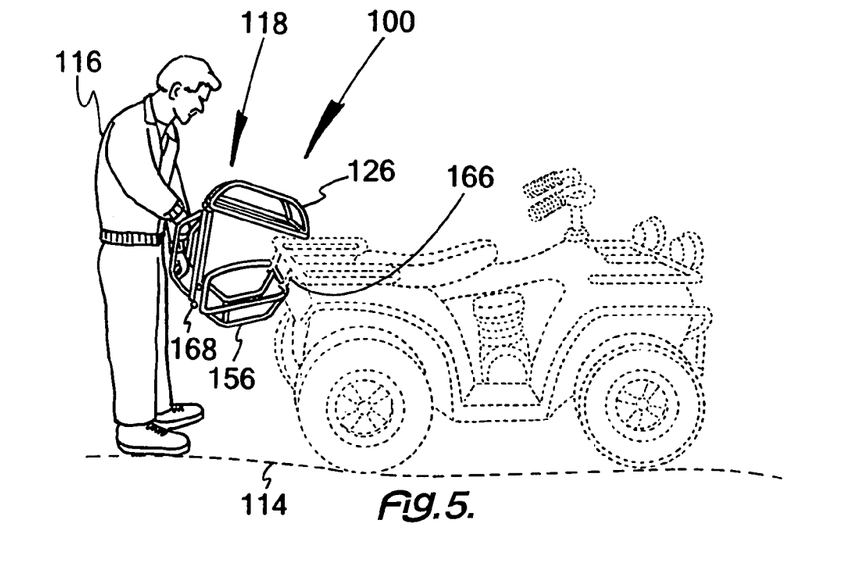
FIG. 5 depicts a perspective view of a lifting device 100 of this invention in a third lifted position 118 on an all-terrain vehicle 110.

Further considering FIG. 3, FIG. 4 and FIG. 5, a person 116 uses one of parallel long sides 132 to lift base rack section 120. Then the grip moves to first base gripping member 122, which is followed by the grip moving to second base gripping member 124. From second base gripping member 124, a person 116 moves to first middle section gripping member 142 as base rack section 120 is held in place at a desired position by hinges 168. As person 116 moves to second middle section gripping member 144, vehicle mounting section 156 comes into play. When person 116 moves to first vehicle mounting gripping member 162, both the middle section 140 and base rack section 120 approach vehicle rack 117 of all-terrain vehicle 112. As person 116 continues, the lift is complete, and complete securing position 102 is achieved.

Figure 9:
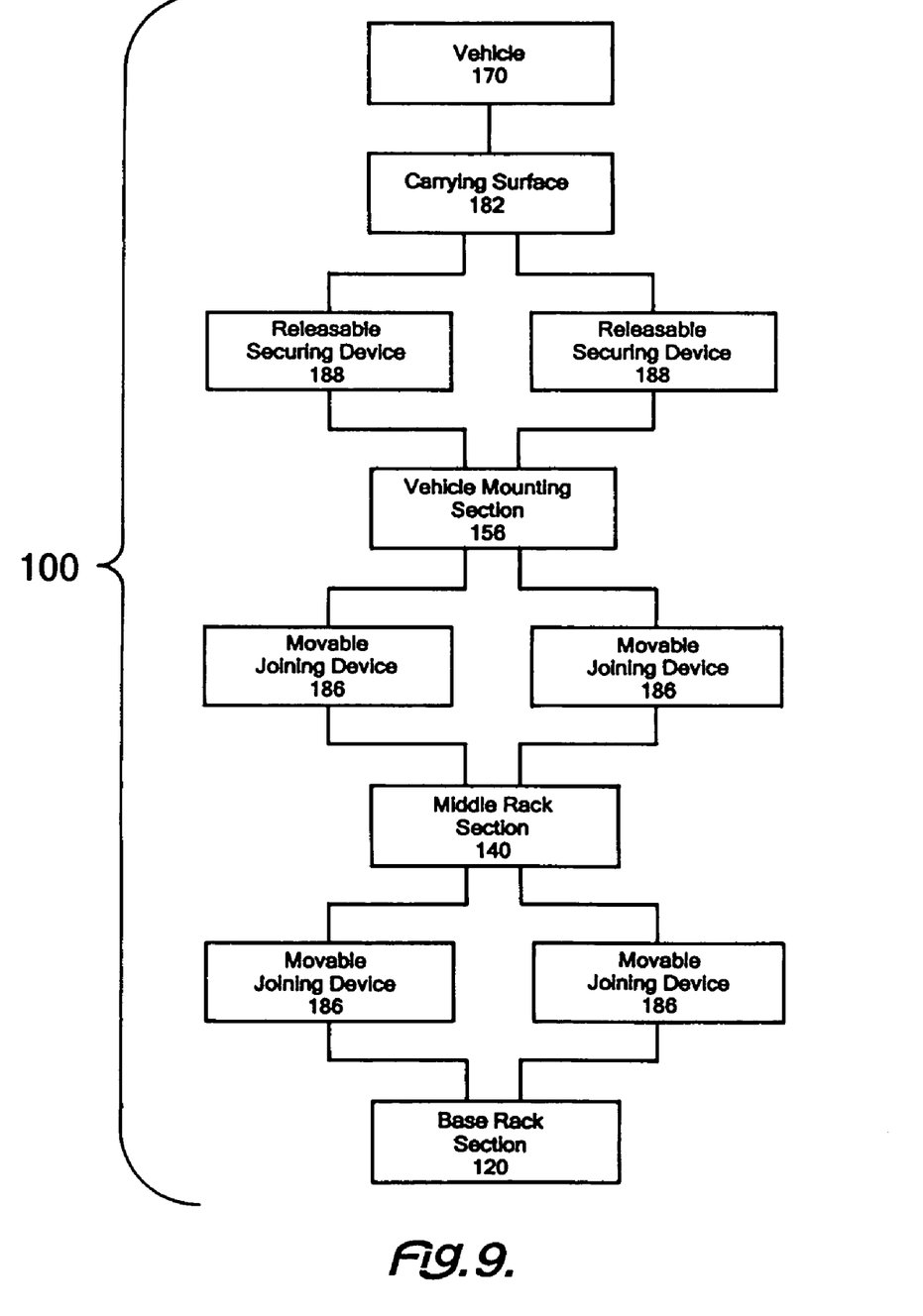
FIG. 9 depicts a block diagram for the lifting device 100 of this invention.

On vehicle mounting section 156, at least one vehicle mounting strap 166, preferably two, are secured to base frame 126, but oppositely disposed from hinges 168. The vehicle mounting strap 166 can be tie downs with a J-hook on either end of adjustable straps or other suitable strap. Vehicle mounting strap 166 permits securing of the lifting device 100 to all-terrain vehicle 112 or another vehicle, such as a pick up truck (FIG. 9).

Figure 6:
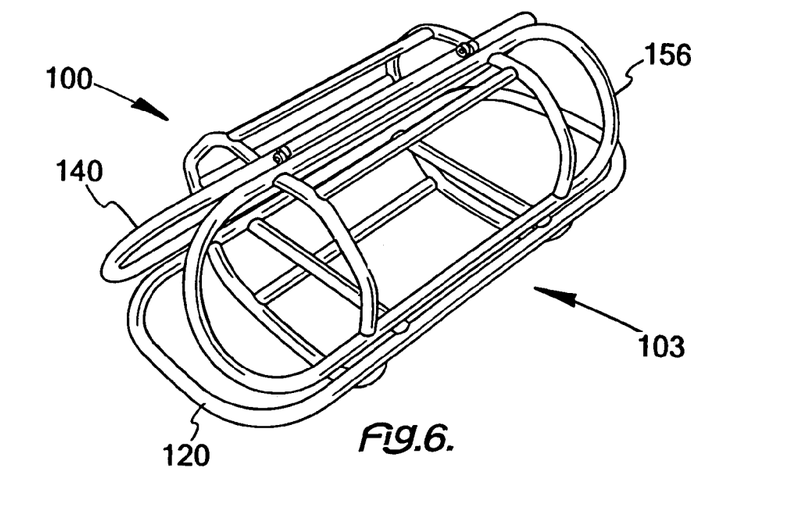
FIG. 6 depicts a perspective view of lifting device 100 of this invention in an unmounted completely folded position 103.
Figure 7:
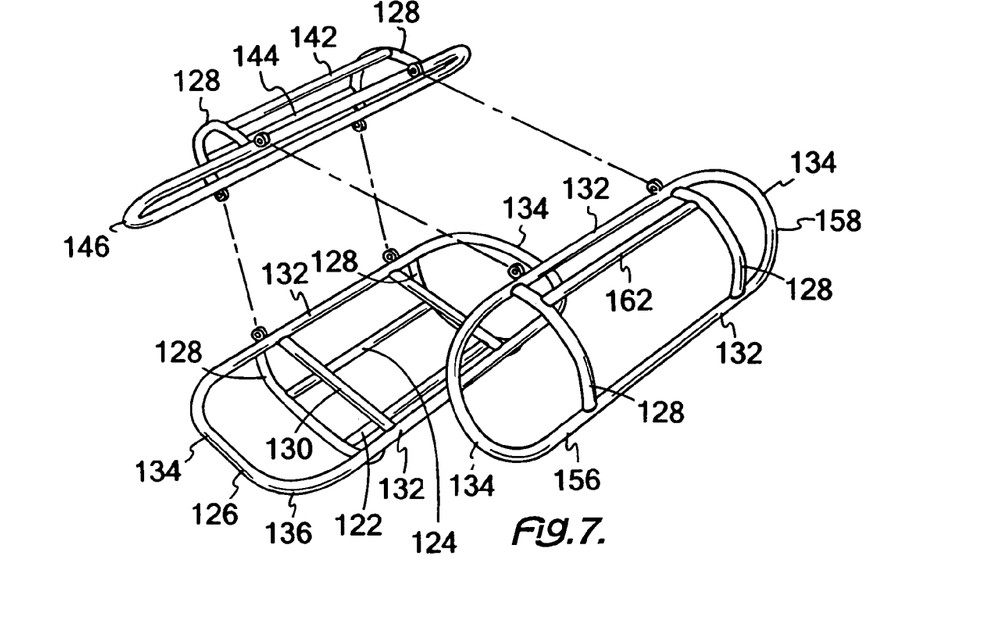
FIG. 7 depicts a perspective, exploded view of lifting device 100 of this invention.
Figure 8:
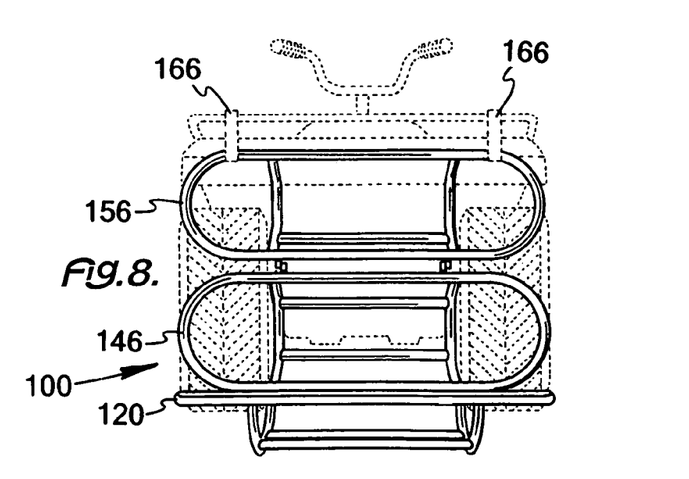
FIG. 8 depicts a perspective view of a lifting device 100 of this invention in a completely open position 104 from the rear of all terrain vehicle 110.

With FIG. 6, FIG. 7, and FIG. 8, the structure of lifting device 100 becomes even more clear. Middle section 140 has a pair of hinges 168 on both sides thereof. To one pair of hinges 168 is attached base rack section 120. To the opposing pair of hinges 168 is attached vehicle mounting section 156. Each pair of hinges 168 permit base rack section 120 to fold over middle section 140 and vehicle mounting section 156. Such folding over results in the unmounted completely folded position 103 as shown in FIG. 6.

Each of base rack section 120, middle section 140 and vehicle mounting section 156 has a base frame 126. Base frame 126 has parallel long sides 132 and parallel ends 134 with arced connectors 136 completing base frame 126. Base frame 126 may be molded as a unit or assembled by glue, welding, or other suitable fastening devices.

To the base frame 126 are attached a pair of parallel cross members 128. To each pair of parallel cross members 128 are preferably secured a pair of gripping members on base rack section 120 and middle section 140. More than two parallel gripping members may be secured to cross members 128. Vehicle mounting section 156 preferably only has one gripping member, but may contain more if desired. The gripping members are spaced sufficiently well for a person 116 using the lifting device 100 to move an object from the base rack section 120 to the middle section 140, and then to the vehicle mounting section 156.

Such gripping members are numbered differently for each of base rack section 120, middle section 140 and vehicle mounting section 156 in order to fully define the lifting procedure. More particularly, base rack section 120 has first base gripping member 122 and second base gripping member 124. Middle section 140 has first middle section gripping member 142 and second middle section gripping member 144. Vehicle mounting section 156 has a gripping member 162. First base gripping member 122, second base gripping member 124, first middle section gripping member 142, second middle section gripping member 144 and vehicle mounting gripping member 162 are preferably mounted perpendicular to cross members 128. However, the gripping members may be mounted to cross members 128 at other angles than 90 degrees.

On base rack member 120 are weight supports 130, which are optional. Such weight supports 130 may be made of metal, plastic or cloth and are preferably one, two, or three, in number. Supports 130 position the deer 112 or other objects on the base rack member 120, thereby supporting the object away from the gripping handles.

With the consideration of FIG. 9, the flexibility of lifting device 100 becomes more clear. Any suitable vehicle 170, with a carrying surface 182 can support lifting device 100. The lifting device 100 can move an object from the base rack section 120 to the middle section 140, and then to the vehicle mounting section 156 and onto that carrying surface 182.

It becomes clear that lifting device 100 may be secured to any suitable vehicle 170. Vehicle 170 may include, but is not limited to, a pickup truck a sport-utility vehicle and a vehicle with an exterior carrying surface or any of the accessible interior carrying surface. Releasable securing device 188 holds lifting device 100 on vehicle 170 at vehicle mounting section 156 as desired. Oppositely disposed from releasable securing device 188 on vehicle mounting section 156 is movable joining device 186. Movable joining device 186 connects vehicle mounting section 156 to middle section 140. Oppositely disposed from vehicle mounting section 156 another movable joining device 186 connects middle section 140 to base rack section 120.

Movable joining device 186, of course, includes hinges 168. Yet, movable joining device 186 is required to permit movement between the sections. This can be done in any suitable fashion. For example, movable joining device 186 may include one or more straps of cloth, metal or plastic. Each movable joining device 186 may also be releasable so that sections can be nested, in order to provide easier storage for lifting device 100.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A lifting device for lifting or moving of a heavy item comprising:
   (a) the lifting device having at least a base rack section, a middle section and a vehicle mounting section;
   (b) the middle section being at least movably connected to the base rack section and the vehicle mounting section;
   (c) the base rack section and the vehicle mounting section being at least connected to opposing sides of the middle section;
   (d) the vehicle mounting section having a releasable securing device secured thereto and oppositely disposed from the middle section;
   (e) the releasable securing device being at least securable to a vehicle;
   (f) the base rack section having a base frame;
   (g) a first base raised cross member and a second base raised cross member being at least secured to the base frame;
   (h) a first base gripping member and a second base gripping member being secured to the first base raised cross member and the second base raised cross member;
   (i) the middle section having a middle frame;
   (j) a first middle raised cross member and a second middle raised cross member being at least secured to the middle frame;
   (k) a first middle gripping member and a second middle gripping member being at least secured to the first middle raised cross member and the second middle raised cross member;
   (l) the base frame for the base rack section, the middle frame, and the vehicle mounting frame being substantially rectangular;
   (m) the base frame having a larger perimeter than the middle frame, and the vehicle mounting frame; and
   (n) the middle frame, and the vehicle mounting frame having a substantially similar rectangular perimeter.

2. The lifting device of claim 1 further comprising:
   (a) the vehicle mounting section having a vehicle mounting frame;
   (b) a first vehicle mounting raised cross member and a second vehicle mounting raised cross member being at least secured to the vehicle mounting frame; and
   (c) a vehicle mounting gripping member being at least secured to the first vehicle mounting raised cross member and the second vehicle mounting raised cross member.

3. The lifting device of claim 2 further comprising:
   (a) the first base raised cross member being at least substantially parallel to the second base raised cross member;
   (b) the first base gripping member being at least substantially parallel to the second base gripping member and at least substantially perpendicular to the first base raised cross member;
   (c) the first middle raised cross member being at least substantially parallel to the second middle raised cross member;
   (d) the first middle gripping member being at least substantially parallel to the second middle gripping member and substantially perpendicular to the first middle raised cross member;
   (e) the first vehicle mounting raised cross member being at least substantially parallel to the second vehicle mounting raised cross member being secured to the middle frame; and
   (f) the vehicle mounting gripping member being at least substantially perpendicular to the first vehicle mounting raised cross member.

4. The lifting device of claim 3 further comprising:
   (a) the middle section being connected to the base rack section by a base pair of hinges;
   (b) the middle section being connected to the vehicle mounting section by a mounting pair of hinges;
   (c) the first base raised cross member, the second base raised cross member, the first middle raised cross member, the second middle raised cross member, the first vehicle mounting raised cross member, and the second vehicle mounting raised cross member having an arcuate or generally trapezoidal shape.

5. The lifting device of claim 4 further comprising:
   (a) the base frame including at least one weight support substantially;
   (b) the at least one weight support being substantially parallel to the first base raised cross member;
   (c) the at least one weight support being an elongated flat material;
   (d) the elongated flat material being made of metal, plastic or cloth; and
   (e) the at least one weight support being one, two, or three in number.

6. A lifting device for lifting or moving of a heavy item onto a vehicle comprising:
   (a) the lifting device having at least a base rack section being substantially rectangular, and a vehicle mounting section being substantially rectangular;
   (b) the base rack section being at least movably connected to vehicle mounting section;
   (c) the vehicle mounting section having a releasable securing device secured thereto and oppositely disposed from the middle section;
   (d) the releasable securing device being at least securable to a vehicle;
   (e) the releasable securing device being an adjustable strap;
   (f) the base rack section having a base frame;
   (g) a first base raised cross member and a second base raised cross member being secured to the base frame;
   (h) a first base gripping member and a second base gripping member being secured to the first base raised cross member and the second base raised cross member; and
   (i) a middle section being at least movably connected the base rack section between vehicle mounting section;
   (j) the middle section having a middle frame;
   (k) a first middle raised cross member and a second middle raised cross member being at least secured to the middle frame; and
   (l) a first middle gripping member and a second middle gripping member being at least secured to the first middle raised cross member and the second middle raised cross member.

7. The lifting device of claim 6 further comprising:
   (a) the vehicle mounting section having a vehicle mounting frame;
   (b) a first vehicle mounting raised cross member and a second vehicle mounting raised cross member being at least secured to the vehicle mounting frame; and (c) a vehicle mounting gripping member being at least secured to the first vehicle mounting raised cross member and the second vehicle mounting raised cross member.

8. The lifting device of claim 7 further comprising:
(a) the first base raised cross member being at least substantially parallel to the second base raised cross member;
(b) the first base gripping member being at least substantially parallel to the second base gripping member and at least substantially perpendicular to the first base raised cross member;
(c) the first middle raised cross member being at least substantially parallel to the second middle raised cross member;
(d) the first middle gripping member being at least substantially parallel to the second middle gripping member and substantially perpendicular to the first middle raised cross member;
(e) the first vehicle mounting raised cross member being at least substantially parallel to the second vehicle mounting raised cross member being secured to the vehicle mounting frame; and
(f) the vehicle mounting gripping member being at least substantially perpendicular to the first vehicle mounting raised cross member.

9. The lifting device of claim 8 further comprising:
(a) the base frame for the base rack section, the middle frame, and the vehicle mounting frame being substantially rectangular;
(b) the base frame having a larger perimeter than the middle frame, and the vehicle mounting frame; and
(c) the middle frame, and the vehicle mounting frame having at least a substantially similar rectangular perimeter.

10. The lifting device of claim 9 further comprising:
(a) the middle section being connected to the base rack section by a base pair of hinges;
(b) the middle section being connected to the vehicle mounting section by a mounting pair of hinges;
(c) the first base raised cross member, the second base raised cross member, the first middle raised cross member, the second middle raised cross member, and the first middle raised cross member, and to the second middle raised cross member having an arcuate or generally trapezoidal shape.

11. The lifting device of claim 10 further comprising:
(a) the base frame including at least one weight support substantially;
(b) the at least one weight support being substantially parallel to the first base raised cross member;
(c) the at least one weight support being an elongated flat material;
(d) the elongated flat material being made of metal, plastic or cloth; and
(e) the at least one weight support being one, two, or three in number.

12. In a vehicle suitable for use as a hunting vehicle, the improvement comprising:
(a) a lifting device for lifting or moving of large game taken while hunting;
(b) the lifting device having at least a base rack section, a middle section and a vehicle mounting section;
(c) the middle section being at least movably connected to the base rack section and the vehicle mounting section;

(d) the base rack section and the vehicle mounting section being at least connected to opposing sides of the middle section;
(e) the vehicle mounting section having a releasable securing device secured thereto and oppositely disposed from the middle section;
(f) the releasable securing device being at least securable to the vehicle;
(g) the base rack section having a base frame;
(h) a first base raised cross member and a second base raised cross member being at least secured to the base frame;
(i) a first base gripping member and a second base gripping member being secured to the first base raised cross member and the second base raised cross member;
(j) the middle section having a middle frame;
(k) a first middle raised cross member and a second middle raised cross member being at least secured to the middle frame;
(l) a first middle gripping member and a second middle gripping member being at least secured to the first middle raised cross member and the second middle raised cross member;
(m) the vehicle mounting section having a vehicle mounting frame;
(n) a first vehicle mounting raised cross member and a second vehicle mounting raised cross member being at least secured to the vehicle mounting frame;
(o) a vehicle mounting gripping member being at least secured to the first vehicle mounting raised cross member and the second vehicle mounting raised cross member;
(p) the first base raised cross member being at least substantially parallel to second base raised cross member;
(q) the first base gripping member being at least substantially parallel to the second base gripping member and at least substantially perpendicular to the first base raised cross member;
(r) the first middle raised cross member being at least substantially parallel to the second middle raised cross member;
(s) the first middle gripping member being at least substantially parallel to the second middle gripping member and substantially perpendicular to the first middle raised cross member;
(t) the first vehicle mounting raised cross member being at least substantially parallel to the second vehicle mounting raised cross member being secured to the middle frame;
(u) the vehicle mounting gripping member being at least substantially perpendicular to the first vehicle mounting raised cross member;
(v) the base frame for the base rack section, the middle frame, and the vehicle mounting frame being substantially rectangular;
(w) the base frame having a larger perimeter than the middle frame and the vehicle mounting frame; and
(x) the middle frame and the vehicle mounting frame having at least a substantially similar rectangular perimeter.

13. The vehicle of claim 12 further comprising:
(a) the middle section being connected to the base rack section by a base pair of hinges;
(b) the middle section being connected to the vehicle mounting section by a mounting pair of hinges;

(c) the first base raised cross member, the second base raised cross member, the first middle raised cross member, the second middle raised cross member, the first vehicle mounting raised cross member, and the second vehicle mounting raised cross member having an arcuate or generally trapezoidal shape;

(d) the base frame including at least one weight support substantially;

(e) the at least one weight support being substantially parallel to the first base raised cross member;

(f) the at least one weight support being an elongated flat material;

(g) the elongated flat material being made of metal, plastic or cloth; and (h) the at least one weight support being one, two, or three in number.

* * * * *